United States Patent [19]
Schmidt et al.

[11] Patent Number: 5,565,275
[45] Date of Patent: Oct. 15, 1996

[54] PROCESS FOR THE PRODUCTION OF COMPOSITE ARTICLES OF POLYESTERS AND ELASTOMERS

[75] Inventors: Friedrich G. Schmidt; Horst Heuer; Thomas Grosse-Puppendahl, all of Haltern, Germany

[73] Assignee: Huels Aktiengesellschaft, Marl, Germany

[21] Appl. No.: 265,246

[22] Filed: Jun. 24, 1994

[30] Foreign Application Priority Data

Sep. 21, 1993 [DE] Germany .................... 43 31 995.5

[51] Int. Cl.$^6$ .................. B32B 25/08; B32B 27/36; C08K 5/54; C08L 67/06
[52] U.S. Cl. .................. 428/483; 428/480; 428/447; 524/264; 524/265; 525/93; 525/98; 525/168; 525/169; 525/171; 525/173; 525/174; 528/302; 528/308; 528/308.6; 528/308.7
[58] Field of Search .................. 156/307.1, 308.2; 264/236, 331.13, 331.15, 331.17, 331.18, 331.21, 347; 428/424.2, 483, 323, 482, 492; 525/445, 168, 171, 173, 174, 177, 169; 524/264, 265, 114, 504, 505, 513, 265, 261; 523/203; 528/302, 308, 308.6, 308.7, 307

[56] References Cited

U.S. PATENT DOCUMENTS

| | | | |
|---|---|---|---|
| 3,642,518 | 2/1972 | Miki et al. | 117/72 |
| 3,663,264 | 5/1972 | Wesch | 117/68 |
| 3,925,272 | 12/1975 | Ibata et al. | 260/4 |
| 3,972,973 | 8/1976 | Yardley et al. | 264/265 |
| 4,287,324 | 9/1981 | Coran et al. | 525/408 |
| 4,381,640 | 5/1983 | Chakravarti et al. | 57/242 |
| 4,414,272 | 11/1983 | Watanabe et al. | 428/331 |
| 4,496,674 | 1/1985 | Ehrhart et al. | 523/500 |
| 4,800,120 | 1/1989 | Jadamus et al. | 428/286 |
| 4,816,345 | 3/1989 | Jadamus et al. | 428/521 |
| 4,835,063 | 5/1989 | Jadamus et al. | 428/495 |
| 4,921,762 | 5/1990 | Jadamus et al. | 428/521 |
| 5,102,489 | 4/1992 | Grosse-Puppendahl et al. | 156/307.1 |
| 5,122,420 | 6/1992 | Baron et al. | 428/474.4 |
| 5,132,182 | 7/1992 | Grosse-Puppendahl et al. | 428/475.8 |
| 5,153,076 | 10/1992 | Jadamus et al. | 428/521 |
| 5,332,621 | 7/1994 | Schmidt et al. | 428/318.4 |

FOREIGN PATENT DOCUMENTS

| | | |
|---|---|---|
| 0375867 | 7/1990 | European Pat. Off. . |
| 2271313 | 4/1994 | United Kingdom . |

*Primary Examiner*—Paul J. Thibodeau
*Assistant Examiner*—Vivian Chen
*Attorney, Agent, or Firm*—Oblon, Spivak, McClelland, Maier & Neustadt, P.C.

[57] ABSTRACT

Polyester/elastomer composites are produced by vulcanizing a polyester which contains aliphatic double bonds in the presence of a vulcanizate comprising:

I. 100 parts by weight of a rubber,
II. 0 to 300 parts by weight of fillers,
III. 1 to 10 parts by weight of peroxidic vulcanization agent,
IV. 0.5 to 4 parts by weight of vulcanization activators,
V. 0 to 150 parts by weight of plasticizer and
VI. 0.5 to 10 parts by weight of a silane of the formula $$X\text{—}R'\text{—}Si(OR^2)_3$$

wherein X contains an aliphatic double bond or an epoxide group.

11 Claims, No Drawings

PROCESS FOR THE PRODUCTION OF COMPOSITE ARTICLES OF POLYESTERS AND ELASTOMERS

BACKGROUND OF THE INVENTION

1. Field of the Invention

The present invention provides a process for preparing composite articles comprising vulcanizing at least one rigid component based on a thermoplastic polyester with at least one flexible component which is a vulcanizate. The invention further provides such composite articles.

2. Discussion of the Background

Articles made from a single material often lack a variety of desirable properties. For example, articles made from a single material can not possess high strength and rubber elasticity or high hardness and rigidity on one side while simultaneously possessing non-skid properties on the other side.

To provide articles with multiple properties, composite articles manufactured from different materials are used. Composite articles require firm adhesion between the different materials in order to function properly. Various methods of firmly bonding rubbers and thermoplastics to one another are known. Composite materials of thermoplastically rigid and elastomeric molding compositions are usually joined together by gluing, screwing, riveting, mechanical clawing, or using an adhesion promoter. Unfortunately, to date these methods have provided composite articles in which the different materials are unsatisfactorily bonded.

More recently, processes have been developed for production of molding compositions based on polyphenylene ethers (PPE) bonded to certain rubbers which can be vulcanized with sulphur or peroxide (compare EP-A-0 196 407 and EP-A-0 315 749). The adhesive strength values achieved by these processes are considerably improved.

It would be desirable to prepare other composite materials in which the thermoplastic component simultaneously has a good resistance to solvents, stability during weathering and excellent sliding friction properties, in addition to a high heat distortion point. For example, it would be desirable to replace the PPEs in the above composites with other thermoplastics such as polyesters which are known to meet the above-mentioned requirements. Unfortunately, PPE can not be directly replaced with polyesters because adequate adhesion values cannot be achieved under the process conditions recognized as essential (see comparison experiments).

Other methods are known for preparing composites of polyesters and rubbers. EP-A-0 375 867 describes a process for the preparation of such composites in which the thermoplastic content comprises, to the extent of at least 30%, a reaction product of a thermoplastic polyester and a polyisocyanate. These reaction products have the disadvantage that, at a sufficiently high concentration of polyisocyanate, they can be injection-molded or extruded only in a very narrow processing window.

SUMMARY OF THE INVENTION

Accordingly, one object of the present invention is to provide a process for producing composite articles of at least one rigid component and at least one flexible component.

A second object of the present invention is to provide such composite articles.

These and other object, which will become apparent during the following detailed description, have been achieved by the present inventors' discovery that certain polyesters can be employed in a composite with rubbers.

DETAILED DESCRIPTION OF THE PREFERRED EMBODIMENTS

The process of the present invention comprises vulcanizing under customary vulcanization conditions a rigid component based on a thermoplastic polyester which contains aliphatic double bonds with a flexible component based on the following rubber composition:

I. 100 parts by weight of a rubber,
II. 0 to 300 parts by weight of fillers,
III. 1 to 10 parts by weight of peroxidic vulcanization agent,
IV. 0 to 4 parts by weight of vulcanization activators,
V. 0 to 150 parts by weight of plasticizer and
VI. 0.5 to 10 parts by weight of a silane of the formula

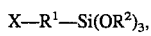

in which $R^1$ can be any desired divalent radical or a direct bond, while the radicals $R^2$ independently of one another can be hydrogen, a $C_{1-20}$ alkyl, a $C_{1-6}$ alkoxy substituted $C_{1-20}$ alkyl, a $C_{3-20}$ cycloalkyl or a $C_{6-20}$ aryl; and X is either:

a) a group of the formula

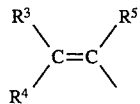

wherein $R^3$, $R^4$ and $R^5$ independently of one another are chosen from the same radicals as $R^2$ or denote a group —$COOR^2$; or b) a group of the formula

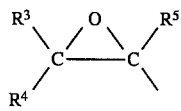

wherein $R^3$, $R^4$ and $R^5$ have the above meaning.

$R^1$ is preferably a direct bond, a linear $C_{1-12}$ alkylene group or a carboxyalkylene group of the formula

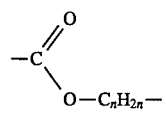

where n is 1 to 12.

$R^2$ is preferably an $C_{1-8}$ alkyl group or an $C_{1-6}$ alkoxy substituted $C_{1-8}$ alkyl group.

$R^3$, $R^4$ and $R^5$ are preferably hydrogen, an $C_{1-8}$ alkyl group or an $C_{6-10}$ aryl group.

The use of peroxides and silanes in rubber compounds is conventionally known. Peroxides are preferred vulcanization agents to sulphur or sulphur donors if a high heat stability is to be achieved during vulcanization.

Silanes are used in polymers such as rubbers, thermosets and thermoplastics if binding of inorganic fillers, for example talc powder, quartz powder or glass fibers, to the organic polymer is to be effected. The manufacturers of fillers as a rule supply their products to the users in a form already treated with silanes or other sizes. The users mix the fillers pretreated in this way with the polymers, and reinforced molding compositions or reinforced compounds are thus obtained. In the case of systems with a high mineral filler content, however, it may be advantageous to the user to employ non-sized fillers and to admix the silane or other sizes to the polymer, before or together with the inorganic filler, in the so-called "additive process". Such a procedure is often used in the preparation of rubber compounds. These compounds then as a rule comprise about 0.2 to 2.5% by weight of silane, based on the filler, or up to about 1.5% by weight, based on the compound. For example, "DYNASILAN®" (available from Hüls AG, D-45764 Marl) can suitable be used. However, a content of 2% by weight of silane in the compound, based on the filler, is usually not exceeded. Various silanes are employed here, depending on the crosslinker system, for example mercaptosilanes for sulphur crosslinks or vinylsilanes for peroxide crosslinks.

Conceivable bonding mechanisms between the inorganic and organic components have been published in numerous publications. In this context, reference is made in particular to the company specification of Hüls AG, D-45764 Marl, entitled "Anwendungen von organofunktionellen Silanen (Uses of organofunctional silanes)" (October 1989).

In contrast, the silanes according to the present invention are employed specifically to achieve firm bonding at the thermoplastic/vulcanizate boundary. Overall, higher amounts of silane are required for this than for merely attaching inorganic fillers and reinforcing substances. In general, more than about 2% by weight of silane, and preferably more than about 2.5% by weight of silane, based on the filler, should be present.

The rigid component of the present invention is based on a polyester, a polyester molding composition, a polyester blend or a fiber composite material having a polyester matrix.

The thermoplastic polyester containing aliphatic double bonds can be prepared in a conventional manner by transesterification or esterification of aromatic dicarboxylic acids having 8 to 14 C atoms, or esters thereof, with suitable diols and subsequent polycondensation such as described in "Polymer Chemistry", Interscience Publ., New York, 1961, pages 111–127; Kunststoffhandbuch (Plastics Handbook), Volume VIII, C. Hanser Verlag, Munich, 1973 and Journal of Polymer Science, Part A1, 4, pages 1851–1859 (1966).

Suitable aromatic dicarboxylic acids include phthalic acid and iso- and terephthalic acid and esters thereof. The aromatic dicarboxylic acids can be replaced in part by aliphatic and/or cycloaliphatic dicarboxylic acids having up to 12 C atoms such as cyclohexane-1,4-dicarboxylic acid, adipic acid, sebacic acid, azelaic acid and decanedicarboxylic acid as saturated dicarboxylic acids and maleic acid, fumaric acid, aconitic acid, itaconic acid, tetrahydrophthalic acid, tetrahydroisophthalic acid, and tetrahydroterephthalic acid as unsaturated dicarboxylic acids. In a preferred embodiment, the dicarboxylic acid component is based on terephthalic acid.

Suitable diol components include:

diols of the formula HO—$(CH_2)_n$—OH, where n is 2 to 12, preferably ethylene glycol, propane-1,3-diol, butane-1,4-diol and hexane-1,6-diol, neopentylglycol, 1,4-cyclohexanedimethanol, unsaturated diols, preferably butene-1,4-diol.

In an alternative embodiment, these diols can be replaced in part by a poly(oxyalkylene)diol having a molecular weight of up to 3,000, preferably poly(oxyethylene)diol or poly(oxytetramethylene)diol, or by a branched alkylenediol, preferably 2-methyl-1,4-butanediol.

In a particularly preferred embodiment, polyester having a dicarboxylic acid component based on terephthalic acid and a diol component which comprises 0 to 99.9 mol % butane-1,4-diol and 0.1 to 100 mol % butene-1,4-diol is used. The diol component particularly preferably comprises 50 to 99 mol % butane-1,4-diol and 1 to 50 mol % butene-1,4-diol.

The double bond content of the polyester can be established by using a mixture of a polyester containing double bonds and, for example, a polyester which is free from double bonds.

Suitable polyesters according to the present invention appropriately have a viscosity number J, measured in accordance with DIN 53 728 at 25° C. on a solution in phenol/1,2-dichlorobenzene (50:50 weight:weight) having a concentration of 5 g/l, in the range from 80 to 240 cm$^3$/g.

Polyester molding compositions in the context of this invention are formulated to improve the processing properties or to modify the properties during use. Polyester molding compositions can suitable contain stabilizers, lubricants, fillers such as carbon black, graphite, metal spangles, titanium dioxide and zinc sulphide, reinforcing agents such as glass fibers, carbon fibers, aramid fibers or metal fibers, plasticizers, dyestuffs and/or flameproofing agents. The content of reinforcing agents in the molding compositions can be up to 50% by weight, that of flameproofing agents can be up to 20% by weight and that of all the other additives can be up to 10% in total, in each case based on the total molding composition.

Polyester blends in the context of this invention are molding compositions which are composed of polyesters and other polymers and the additives customary in polyester molding compositions. The polymer constituents can be soluble in one another, or one polymer constituent can be dispersed in the other, or the two can form interpenetrating networks with one another.

Any polyester blend can in principle be used in the context of the present invention. Examples which may be mentioned are: polybutylene terephthalate/polycarbonate or polyethylene terephthalate/polycarbonate blends, impact-modified polyesters which comprise, for example, maleic anhydride or glycidyl methacrylate-modified rubbers as impact modifiers, polyester/polyamide blends, blends of polyesters and polyolefins and blends of polyesters and polymethyl methacrylate (PMMA), polymethyl methacrylimide (PMMI), acrylonitrile/butadiene/styrene copolymers (ABS), epoxy resins or block copolyether-ester elastomers. Such systems are described in the following publications: Polymer Blends, Ed.: E. Martuscelli, R. Palumbo and M. Kryszewski, Plenum Press, New York, 1980; Polymer Alloys III, Ed.: D. Klempner and K. C. Frisch, Plenum Press, New York, 1983; WO-A-87/00850; EP-A-0 037 547; EP-A-0 276 327 and H. Saechtling, Kunststoff-Taschenbuch (Plastics Pocketbook), 25th edition, C. Hanser Verlag, Munich, Vienna, 1992.

The polyester content in the polyester blends here should be at least 30% by weight, based on the sum of all the polymeric components.

Fiber composite materials with a polyester matrix are to be understood as meaning materials which are composed of uncut reinforcing fibers or woven fabrics thereof on the one hand and a matrix of polyesters, polyester molding compositions or polyester blends on the other hand.

Fiber composite materials with a matrix of polyesters, polyester molding compositions or polyester blends can be prepared in various ways; for example reinforcing fibers or reinforcing woven fabrics impregnated with polyesters—so-called prepregs—can be consolidated to laminated sheets by pressure and heat. It is also possible to process hybrid yarns of polyester fibers and reinforcing fibers or films of the thermoplastics mentioned and woven fabrics of reinforcing fibers to composite materials under pressure and heat.

Suitable reinforcing fibers include glass fibers, carbon fibers and aramid fibers.

The rubber used for the flexible component is suitably an EP(D)M rubber, a styrene/butadiene (SB) rubber (as E-SBR or S-SBR), Butadiene rubber (BR), natural rubber (NR), isoprene rubber (IR), isobutene/isoprene rubber (IIR), chloro-IIR (CIIR), bromo-IIR (BIIR), nitrile rubber (NBR), chloroprene rubber (CR), a styrene containing block copolymer and/or a polyalkenylene.

EP(D)M rubbers are rubbers which are prepared in a known manner by polymerization of a mixture of ethylene and propylene and if appropriate a diene in the presence of a Ziegler-Natta catalyst.

EPDM rubber is prepared by polymerization of a mixture of more than 25% by weight of ethylene, more than 25% by weight of propylene and up to 10% by weight, in particular 1 to 3% by weight, of a preferably non-conjugated diene, such as bicyclo[2.2.1]heptadiene, hexa-1,4-diene, dicyclopentadiene and, in particular, 5-ethylidenenorbornene.

Styrene/butadiene rubber (SB rubber) can be either E- or S-SBR with a styrene content up to a maximum of about 40 per cent by weight.

E-SBR is prepared in a known manner by polymerization in emulsion, while S-SBR is prepared by polymerization in solution.

Butadiene rubber (BR) can be prepared in a known manner, for example by polymerization with the aid of Li or Co catalysts. The type of linkage has no influence on suitability here.

Natural rubber (NR) is usually used in the cis-1,4-configuration. However, the trans-1,4-configuration is also suitable in the context of this invention.

Isoprene rubber (IR) can be used independently of whether it has been prepared, for example, using Ti or Li catalysts. The cis-1,4/trans-1,4 or 1,2 and 3,4 content has no influence on the adhesion properties.

Isobutene/isoprene rubber (IIR) can be used as such or in halogenated form (CIIR or BIIR).

Nitrile rubber (NBR) is obtained by copolymerization of butadiene and acrylonitrile in weight ratios of about 51:48 to 82:18. It is prepared practically exclusively in aqueous emulsion. The resulting emulsions are worked up to the solid rubber for use in the context of this invention.

Chloroprene rubber (CR) is usually prepared by free radical emulsion polymerization. During this operation, the monomer is incorporated into the polymer in various structures. The cis-1,4/trans-1,4 or 1,2 and 3,4 content and the content of head/head and head/tail linkage has no influence on the adhesion properties.

Styrene-containing block copolymers which can be used are all the known types based on styrene/butadiene or styrene/isoprene including SB, SBS and SIS and corresponding types which comprise a larger number of blocks. The copolymers can be linear or branched here. The flexible phase furthermore can be hydrogenated; corresponding block copolymers are also called styrene/ethylene/butylene/styrene block copolymers (SEBS).

Polyalkenylenes are prepared by ring-opening or ring-extending polymerization of cycloalkenes [see K. J. Ivin, T. Saegusa, "Ring-opening Polymerization", Volume 1, Elsevier Appl. Sci. Publishers, London, in particular pages 121 to 183 (1984)]. Of these, polyoctenylenes are preferred (compare A. Draxler, Kautschuk+Gummi, Kunststoff 1981, pages 185 to 190). Polyoctenylenes with different contents of cis and trans double bonds and different molecular weights are obtainable by methods which are known from the literature.

A rubber which comprises 30 to 100 parts by weight of an EP(D)M rubber and 70 to 0 parts by weight of other rubbers is preferably used in the context of this invention.

Suitable fillers are all the substances which are usually employed in rubbers, such as carbon black, silicic acid, silicates, calcium carbonate, zinc oxide and talc. If highly active fillers are used, an increased amount of silane is required in order to achieve an adhesive bond.

Suitable plasticizers are, in particular, naphthenic and/or aliphatic oils or special plasticizers which are customary in rubber technology, such as polyalcohol fatty acid esters or thioethers, in an amount of preferably up to 50 parts by weight per 100 parts by weight of rubber.

Suitable peroxidic vulcanization agents are the peroxides known to the expert for crosslinking EP(D)M rubbers, such as 2,5-dimethyl-2,5-bis(tert-butylperoxy)hexane, dicumyl peroxide, 4,4-di-tert-butylperoxy-n-butyl valerate, 1,1-di-tert-butylperoxy-3,3,5-trimethyl-cyclohexane and bis (tert-butylperoxyisopropyl)benzene. Details on the use of peroxidic vulcanization agents are to be found in the company brochure "Rubbery Chemical-Crosslinking-Peroxides" from Akzo Chemie (publication date: April 1985).

Suitable vulcanization activators are triallyl cyanurate (TAC) and acrylates such as ethylene glycol dimethacrylate (EDMA), butanediol dimethacrylate (BDMA) and trimethylolpropane trimethacrylate (TRIM). TAC, BDMA and/or EDMA are preferred.

Suitable silanes include those of the vinyltrimethoxy- and -triethoxysilane, vinyltris(2-methoxyethoxy)silane, 3-methacryloxypropyl-trimethoxy- and -triethoxysilane and giycidyloxypropyltrimethoxysilane type. They are preferably employed in amounts of 1 to 8 parts by weight, particularly preferably 2 to 6 parts by weight, per 100 parts by weight of rubber.

The rubber compositions furthermore can comprise other additives such as vulcanization retardants, anti-ageing agents, processing auxiliaries, mould release agents and/or blowing agents. These other additives as a rule make up not more than 50 parts by weight per 100 parts by weight of rubber. The preparation of such compounds is described, for example, by F. W. Barrow in "Rubber Compounding", published in 1988 by Marcel Dekker inc., New York and Basel, or by W. Kleemann in "Mischungen für die Elastverarbeitung (Mixtures for Processing Elastomers)", published in 1982 (VEB Deutscher Verlag für Grundstoffindustrie).

Composite articles in accordance with the present invention be prepared by vulcanizing the flexible component in contact with the rigid component in one stage or two stages. Composite articles of polyesters, polyester molding compositions or polyester blends on the one hand and rubber compounds on the other hand can be produced in either one stage or two stages. Composite articles of fiber composite materials and rubber compounds are produced in two stages.

In the two-stage process, the rigid molding is first produced (for example, by injection molding, extrusion or consolidation of prepregs) and is charged with the rubber compound, preshaped if appropriate. The rigid molding can be charged with the rubber by pressing, injection molding or extrusion. In a second step the rigid molding is exposed to the vulcanization conditions for the rubber.

The two-stage injection molding process is suitably carried out in a manner similar to the two-stage production of two colored injection moldings. A molding of the rigid materials mentioned is used as the insert. The cylinder and screw of the injection molding machine are designed in the known manner for rubber processing and the mould can be heated to the vulcanization temperature. If external mould release auxiliaries are used, it should be ensured that they do not reach the boundary layer of the materials, since they may impair the adhesive bond.

In the case of charging and vulcanization by the two-stage extrusion process, for example, a profile produced in the first stage from the thermoplastic, for example a pipe, is enclosed by the rubber composition and vulcanization is carried out, if appropriate under pressure. A corresponding procedure is followed with sheets, non-wovens, woven fabrics and cables.

The one-stage injection molding process is carried out analogously to the one-stage two-colored injection molding process. In this case, one injection molding machine is equipped for processing thermoplastics and the other for processing rubbers. The mould is heated to the given vulcanization temperature, which should be below the solidification point of the polyester, the polyester molding composition or the polyester blend.

The optimum vulcanization conditions depend on the rubber mixture chosen, in particular its vulcanization system, and the shape of the molding. Conventional parameters can be used as a basis here, since the silane additive does not influence the reaction conditions.

Suitable material temperatures for the rubber mixture in the cylinder are in general in the range from 40° to 80° C., preferably from 60° to 70° C.

Suitable vulcanization temperatures depend on the softening temperatures of the inserts. They are in general in the range from 140° to 200° C. If the softening ranges of the inserts allow, temperatures in the upper range are chosen, for example between 170° and 190° C. The vulcanization times depend on the vulcanization temperatures and on the geometry of the components, as well as on the rubber mixture. They are in general between 30 seconds and 30 minutes; lower temperatures and thicker rubber components require longer times.

The process according to the invention and the composites produced by the process are distinguished by the following advantages:

The composite is preferably produced in a few minutes.

The polyesters employed in the composite system have a high heat distortion point, good resistance to solvents, excellent slide friction properties and only a low water uptake, and can also be employed without problems outside.

The bonding is so strong that in the test case, cohesion fracture occurs in the rubber, but not separation at the phase boundary.

The following articles can be produced from the composites of the present invention: rubber-coated rollers, flanges, pipe and tube couplings, seal frames, shock- and radiation-absorbing components, spring elements, vibration absorbers, reinforced rubber profiles, conveyor belts, drive belts, contact rolls for video and audio tape apparatuses, seals, in particular rotary shaft seals, castors, clutch and brake discs, membranes, pistons with sealing rings, reinforced concertina walls, pump housings and valves, polyester-reinforced rubber hoses and the like.

Having generally described this invention, a further understanding can be obtained by reference to certain specific examples which are provided herein for purposes of illustration only and are not intended to be limiting unless otherwise specified.

EXAMPLES

The following materials were used for preparation of the rubber mixture:

| | |
|---|---|
| BUNA HÜS AP 341: | a random EPDM rubber (Hüls AG, D-45764 Marl) having a Mooney viscosity of ML (1 + 4) 100° C. = 70. |
| DUREX 0: | Carbon black from Degussa with a CTAB value of 20 $m^2/g$. |
| CORAX N 220: | Carbon black from Degussa with a CTAB value of 111 $m^2/g$. |
| CORAX N 550: | Carbon black from Degussa with a CTAB value of 43 $m^2/g$. |
| OMYALITE: | Calcium carbonate from Omya, Cologne, having a specific surface area of about 7.5 $m^2/g$. |
| SILLITIN Z86: | Aluminum silicate from Hoffmann Mineral, Neuburg, Donau having a specific surface area of approximately 14 $m^2/g$. |
| ZnO RS: | Zinc oxide from Carl Arnsberger, Cologne |
| VULKANOX HS: | Polymerized 2,2,4-trimethyl-1,2-dihydroquinoline from Rhein-Chemie, Rheinau |
| BDMA: | Butanediol dimethacrylate, 75% on Ca silicate from Lehmann & Voss |
| PERKADOX 14/40: | bis-tert-Butylperoxy-isopropylbenzene, 40% strength on chalk and $SiO_2$ from Akzo Chemicals, Düren |
| DYNASILAN MEMO: | Methacryloxypropyltrimethoxysilane from Hüls, Troisdorf |
| DYNASILAN AMEO: | Aminopropyltriethoxysilane from Hüls, Troisdorf |
| DYNASILAN VTMOEO: | Vinyltri(methoxyethoxy)silane from Hüls, Troisdorf |
| DYNASILAN GLYMO: | Glycidyloxypropyltrimethoxysilane from Hüls, Troisdorf |
| DYNASILAN DAMO: | N-Aminoethyl-3-aminopropyl-tri- |

| | |
|---|---|
| SUNPAR 2280: | methoxysilane from Hüls, Troisdorf<br>Paraffinic (73%)/naphthenic (23%)/<br>aromatic (4%) oil from Sun Oil, Belgium |

The following molding compositions were employed as the polyester materials:

Type A (not according to the invention) corresponds to a normal polybutylene terephthalate, VESTODUR 1000 from Hüls AG, D-45764 Marl having a solution viscosity J of 108 cm$^3$/g.

Type B corresponds to polybutylene terephthalate having a copolycondensed content of 1 mol % of 2-butene-1,4-diol having a solution viscosity J of 105 cm$^3$/g.

Type C corresponds to polybutylene terephthalate with a copolycondensed content of 5 mol % of 2-butene-1,4-diol having a solution viscosity J of 106 cm$^3$/g.

Type D corresponds to polybutylene terephthalate with a copolycondensed content of 10 mol % of 2-butene-1,4-diol having a solution viscosity J of 105 cm$^3$/g.

Type E corresponds to polybutylene terephthalate with a copolycondensed content of 20 mol % of 2-butene-1,4-diol having a solution viscosity J of 106 cm$^3$/g.

Type F (not according to the invention) corresponds to polybutylene terephthalate with a weight content of 30% of cut glass fibers, VESTODUR GF30 from Hüls AG, D-45764 Marl, having a solution viscosity of 108 cm$^3$/g.

Type G not according to the invention) corresponds to polybutylene terephthalate with a weight content of 30% of glass beads, VESTODUR GK30 from Hüls AG, D-45764 Marl, having a solution viscosity J of 104 cm$^3$/g.

Preparation of the Rubber Mixtures

The individual rubber mixtures I to XV were prepared in a batch laboratory measuring kneader (Haake). 28.57 g of BUNA HüLS AP 341 were first plasticized at a starting temperature of 60° C. and at a speed of rotation of 64 rpm. 5.71 g of SUNPAR 2280, the filler shown in Table 1, 1.43 g of ZnO RS and 0.57 g of VULKANOX HS were incorporated into the rubber in the course of about five minutes and the mixture was homogenized for a further three minutes. During this period, the temperature rose to about 110° C. This premix was then stored at room temperature for 24 hours. 1.71 g of PERKADOX 14/40, 0.43 g of BDMA and the silane shown in Table 1 were then incorporated homogeneously under the same conditions (60° C. starting temperature, 64 rpm) in the course of about four minutes. During this operation, the temperature of the mixture did not rise above 130° C.

Production of the Composites

Test specimens (100×100×4 mm) of the polyesters investigated were produced by the injection molding process at a cylinder temperature of 250° C. A sheet was then placed in a mould of V2A steel (100×100×8 mm) and covered with a 20 mm wide piece of PTFE film on one side. The total surface was covered with the rubber mixture to be tested. The sheet prepared in this way was pressed in a hydraulic press (Schwabenthan—Polystat 200T) for 20 minutes at 180° C. under 200 bar.

Testing the Adhesive Bond

The adhesive bond between the polyester material and vulcanized rubber was tested by means of a peel test in accordance with DIN 53 531. The rubber component, which had been kept separated from the polyester material by the Teflon film during vulcanization, was clamped such that the rubber strip was pulled off perpendicularly to the thermoplastic surface in the peel tests. The results are shown in Table 2, the evaluation being made as follows:

A Adhesion (fracture in the rubber, that is to say cohesive fracture; high separating force)

TABLE 1

Composition of the rubber mixtures

| | Filler | | | | | DYNASILAN type | | | | |
|---|---|---|---|---|---|---|---|---|---|---|
| | | | | Corax | Corax | | | | | |
| Mixture | Sillitin Z86 [g] | Omylatie [g] | Durex 0 [g] | N 220 [g] | N 550 [g] | MEMO [g] | GLYMO [g] | AMEO [g] | DAMO [g] | VTMOEO [g] |
| I[a)] | — | — | 22.86 | — | — | — | — | — | — | — |
| II | — | — | 22.86 | — | — | 0.57 | — | — | — | — |
| III | — | — | 22.86 | — | — | 1.14 | — | — | — | — |
| IV[a)] | — | — | 22.86 | — | — | — | — | — | 1.14 | — |
| V[a)] | — | — | 22.86 | — | — | — | — | 1.14 | — | — |
| VI | — | — | 22.86 | — | — | — | 1.14 | — | — | — |
| VII | — | — | 22.86 | — | — | — | — | — | — | 1.14 |
| VIII[a)] | 22.86 | — | — | — | — | — | — | — | — | — |
| IX | 22.86 | — | — | — | — | 1.14 | — | — | — | — |
| X[a)] | — | 22.86 | — | — | — | — | — | — | — | — |
| XI | — | 22.86 | — | — | — | 1.14 | — | — | — | — |
| XII | — | — | — | 22.86 | — | 1.14 | — | — | — | — |
| XIII | — | — | — | — | 22.86 | 1.14 | — | — | — | — |
| XIV | — | — | — | 22.86 | — | — | 1.14 | — | — | — |
| XV | — | — | — | — | 22.86 | — | 1.14 | — | — | — |

[a)]not according to the invention

No adhesion (fracture in the interface between the rubber and polyester, that is to say adhesive fracture; low to very low separating force)

p partial adhesion boundary between cohesive and adhesive fracture; moderate separating force)

TABLE 2

| | | Testing the adhesive bond | | | | | | |
|---|---|---|---|---|---|---|---|---|
| | Rubber | Molding composition | | | | | | |
| Example | mixture | A[a] | B | C | D | E | F[a] | H[a] |
| 1 | I[a] | — | — | — | — | — | — | — |
| 2 | II | — | — | — | — | A | — | — |
| 3 | III | — | A | A | A | A | p | p |
| 4 | IV[a] | — | — | — | — | — | — | — |
| 5 | V[a] | — | — | — | — | — | — | — |
| 6 | VI | — | p | A | A | A | — | — |
| 7 | VII | — | p | A | A | A | p | p |
| 8 | VIII[a] | — | — | — | — | — | — | — |
| 9 | XI | — | — | — | A | A | p | p |
| 10 | X[a] | — | — | — | — | — | — | — |
| 11 | XI | — | — | — | A | A | p | p |
| 12 | XII | — | — | — | p | A | — | — |
| 13 | XIII | — | p | A | A | A | p | p |
| 14 | XIV | — | — | p | A | A | — | — |
| 15 | XV | — | p | p | A | A | — | — |

[a] not according to the invention

Examples 3, 7, 9, 11 and 13 show that when reinforced or filled molding compositions (molding compositions F and G) are used, partial adhesion can also be obtained if the molding composition is based on a standard polyester. This can be utilized in the following manner:

1) If a reinforced or filled molding composition is used a lower content of double bonds is required in the polyester to produce a firm bond; or 2) If a reinforced or filled molding composition having a relatively high double bond content in the polyester is used, the amount of silane required for production of a firm bond is reduced.

Having now fully described the invention, it will be apparent to one of ordinary skill in the art that many changes and modifications can be made thereto without departing from the spirit or scope of the invention as set forth herein.

What is claimed as new and is desired to be secured by letters patent of the United States is:

1. A composite article produced by vulcanizing at least one rubber component in the presence of at least one polyester component, wherein said polyester component is a thermoplastic polyester which contains ethylenically unsaturated double bonds, wherein said thermoplastic polyester comprises a polyester having unsaturated diol monomer units and dicarboxylic acid monomer units selected from the group consisting of phthalic acid monomer units, isophthalic acid monomer units, terephthalic acid monomer units and mixtures thereof and said wherein rubber component is a vulcanizate comprising:

(I) 100 parts by weight of a rubber, (II) 0 to 300 parts by weight of fillers, (III) 1 to 10 parts by weight of peroxidic vulcanization agent, (IV) 0 to 4 parts by weight of vulcanization activators, (V) 0 to 150 parts by weight of plasticizer, and (VI) 0.5 to 10 parts by weight of a silane of the formula:

$$X-R^1-Si(OR^2)_3$$

wherein $R^1$ is a divalent radical or a direct bond; $R^2$ is hydrogen, a $C_{1-20}$ alkyl, a $C_{1-6}$ alkoxy substituted $C_{1-20}$ alkyl, a $C_{3-20}$ cycloalkyl or a $C_{6-20}$ aryl; and X is chosen from the two formulae

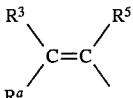

or

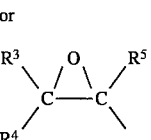

wherein $R^3$, $R^4$ and $R^5$ independently of one another have the same meaning as $R^2$ or denote a group $-COOR^2$.

2. The composite article of claim 1, wherein said polyester component is selected from the group consisting of a polyester, a polyester molding composition, a polyester blend containing at least 30 wt % of said thermoplastic polyester, and a fiber composite material with a polyester matrix.

3. The composite article of claim 1, wherein said dicarboxylic acid monomer units further comprise monomer units selected from the group consisting of $C_{1-12}$ aliphatic dicarboxylic acid monomer units, $C_{1-12}$ cycloaliphatic dicarboxylic acid monomer units and mixtures thereof.

4. The composite article of claim 1, wherein said unsaturated diol monomer units comprises 1,4-butenediol monomer units.

5. The composite article of claim 4, wherein said dicarboxylic acid monomer units are terephthalic acid monomer units and said diol monomer units comprise 0 to 99.9 mol. % 1,4-butanediol monomer units and 0.1 to 100 mol. % 1,4-butenediol monomer units.

6. The composite article of claim 5, wherein said diol monomer units comprise 50 to 99 mol. % 1,4-butanediol monomer units and 1 to 50 mol. % 1,4-butenediol monomer units.

7. The composite article of claim 1, comprising 1 to 8 parts by weight of said silane per 100 parts by weight of rubber.

8. The composite article of claim 7, comprising 2 to 6 parts by weight of said silane per 100 parts by weight of rubber.

9. The composite article of claim 1, wherein said rubber component is selected from the group consisting of ethylene/propylene rubber, ethylene/propylene/diene rubber, styrene/butadiene rubber, butadiene rubber, natural rubber, isoprene rubber, isobutene/isoprene rubber, chloro-isobutene/isoprene rubber, bromo-isobutene/isoprene rubber, nitrile rubber, chloroprene rubber a styrene-containing block copolymer, a polyalkenylene and mixtures thereof.

10. The composite article of claim 9, wherein said rubber component comprises 30 to 100 parts by weight of an ethylene/propylene or ethylene/propylene/diene rubber and 70 to 0 parts by weight of at least one other rubber.

11. The composite article of claim 1, wherein said rubber composition further comprises a member selected from the group consisting of vulcanization retardants, anti-aging agents, processing auxiliaries, mold release agents, blowing agents and mixtures thereof.

* * * * *